(12) United States Patent
Fisch et al.

(10) Patent No.: US 7,802,980 B2
(45) Date of Patent: Sep. 28, 2010

(54) SYSTEM, METHOD AND APPARATUS FOR CONFIGURING AN END OF ARM TOOL IN A MOLDING SYSTEM

(75) Inventors: Ralf Walter Fisch, Saarburg (DE); Sven Kmoch, Platten (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 512 days.

(21) Appl. No.: 11/736,636

(22) Filed: Apr. 18, 2007

(65) Prior Publication Data
US 2008/0256789 A1  Oct. 23, 2008

(51) Int. Cl.
*B29C 45/42* (2006.01)
(52) U.S. Cl. .................. 425/444; 425/182; 425/185; 425/190
(58) Field of Classification Search ............... 425/351, 425/444, 547, 182, 185, 190, 556; 29/281, 29/705
See application file for complete search history.

(56) References Cited

U.S. PATENT DOCUMENTS

| | | | | |
|---|---|---|---|---|
| 6,190,157 B1 * | 2/2001 | Hofstetter et al. | ........... | 425/526 |
| 6,450,795 B1 * | 9/2002 | Fields et al. | ................. | 425/182 |
| 6,817,855 B2 * | 11/2004 | Unterlander et al. | ........ | 425/150 |
| 6,916,168 B2 * | 7/2005 | Romanski et al. | ........... | 425/547 |
| 6,951,453 B2 * | 10/2005 | Neter et al. | ................. | 425/526 |
| 7,156,647 B2 * | 1/2007 | Zoppas et al. | ............... | 425/526 |
| 7,326,046 B2 * | 2/2008 | Neter et al. | ................. | 425/547 |

FOREIGN PATENT DOCUMENTS

| CA | 2326449 C | | 10/1999 |
|---|---|---|---|
| CA | 2589424 A1 | | 6/2006 |
| JP | 11048324 A | * | 2/1999 |
| WO | 9747459 A1 | | 12/1997 |
| WO | 2005037521 A1 | | 4/2005 |

\* cited by examiner

*Primary Examiner*—Yogendra N Gupta
*Assistant Examiner*—Emmanuel S Luk
(74) *Attorney, Agent, or Firm*—Husky Intellectual Property Services (57) ABSTRACT

According to embodiments of the present invention, there is provided a system, a method and an apparatus for configuring an end of arm tool within a molding environment. The end of arm tool comprises a base structure attachable, in use, to an actuator of the molding system, the base structure comprising a mounting structure interface; a mounting structure configured to be releasably accepted, in use, within the mounting structure interface; the mounting structure for receiving, in use, a part receptacle; the base structure comprising a service connecting interface configured to connect, in use, a service to the part receptacle via the mounting structure.

15 Claims, 11 Drawing Sheets

SYSTEM, METHOD AND APPARATUS FOR CONFIGURING AN END OF ARM TOOL IN A MOLDING SYSTEM

FIELD OF THE INVENTION

The present invention generally relates to, but is not limited to, molding systems, and more specifically the present invention relates to, but is not limited to, a system, method and apparatus for configuring an end of arm tool in a molding system.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethelene terephalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, robots, etc.

One consideration for economical operation of the molding system is cycle time or, in other words, time that elapses between a point in time when the cavity and core halves are closed and the molded articles are formed and a subsequent point in time when they are opened and the molded articles are removed. As one will appreciate, the shorter the cycle time, the higher the number of molded articles that can be produced in a particular mold in a given time. One attempt to minimize the cycle time is a so-called "post-mold cooling" process. Generally speaking, the post-mold cooling process involves removing the molded articles from the mold once they are sufficiently cooled to enable ejection of the molded articles without causing significant deformation to the molded articles during its transfer to an auxiliary cooling structure. Post mold cooling then occurs independently (but in parallel) to the injection cycle of the molding machine. As an example, the auxiliary cooling structure includes a plurality of cooling tubes mounted onto a take-off plate with vacuum service and cooling service being supplied to the cooling tubes from a source of vacuum service and cooling service connected to the take-off plate. The take-off plate comprises an interface for mounting the take-off plate to a robot and, within this configuration, is typically referred to by those of skill in the art as an "End Of Arm Tool" (EOAT).

Naturally, a layout of the EOAT has to correspond to a layout of the core pieces in the mold. It is known to have molds with varying numbers of molding cavities. Furthermore, an entity operating the molding system may choose to change the size of the mold in the system already in operation. In line with business consideration, the entity operating the molding system may choose to increase or decrease cavitation by, for example, installing a different mold within the molding system. It should be clear that if a new mold has a cavitation different from a cavitation of the old mold, the entity operating the molding system also needs to change the EOAT to accommodate the differing layout of mold cavities. A typical approach to changing configuration of the EOAT is to remove an old EOAT (i.e. the EOAT complementary to the old mold) and replace it with a new EOAT (i.e. the EOAT complementary to the new mold). As part of changing the EOAT, a calibration process is carried out to ensure that the new EOAT will correctly cooperate with other components of the molding system. For example, a technician (or another person) calibrating the new EOAT may need to ensure that lateral movement of the new EOAT into and out of the open mold will not interfere with or otherwise damage other parts of the molding system.

Due to business considerations and as is appreciated by those skilled in the art, it is desirable to minimize time and costs taken to replace the EOAT. Some prior art solutions have attempted to mitigate this time problem by providing a quick change interface between the EOAT and the robot to enable the technician (or another person) to quickly exchange the old EOAT for the new EOAT. However, even within this solution, the technician (or another person) will need to spend time to calibrate the new EOAT.

SUMMARY OF THE INVENTION

According to a first broad aspect of the present invention, there is provided an end of arm tool for use within a molding system. The end of arm tool comprises a base structure attachable, in use, to an actuator of the molding system, the base structure comprising a mounting structure interface; a mounting structure configured to be releasably accepted, in use, within the mounting structure interface; the mounting structure for receiving, in use, a part receptacle; the base structure comprising a service connecting interface configured to connect, in use, a service to the part receptacle via the mounting structure.

According to a second broad aspect of the present invention, there is provided a base structure for use within a molding system. The base structure comprises an actuator mounting interface for connection, in use, to an actuator of the molding system; a mounting structure interface for releasably accepting a mounting structure; and a service connecting interface for connecting a service to the mounting structure.

According to a third broad aspect of the present invention, there is provided a mounting structure for use within a molding system. The mounting structure comprises a base structure mounting interface for releasably connecting, in use, to a base structure mounted to an actuator of the molding system; a part receptacle mounting interface for releasably accepting a part receptacle; and a service connecting interface for connecting, in use, a service from the base structure to the part receptacle.

According to a fourth broad aspect of the present invention, there is provided a method of configuring an end of arm tool.

The method comprises, at a first instance in time, installing a base structure to an actuator, calibrating the base structure; attaching a first mounting structure to the base structure, the first mounting structure having a first configuration. The method further comprises, at a second instance in time after the first instance in time, removing the first mounting structure from the base structure; attaching a second mounting structure to the base structure, the second mounting structure having a second configuration.

According to another broad aspect of the present invention, there is provided a method of re-configuring an End Of Arm Tool (EOAT), the EOAT comprising a base structure attached to an actuator and a first mounting structure attached to the base structure, the first mounting structure having a first configuration, the base structure having been calibrated. The method comprises removing the first mounting structure from the base structure; attaching a second mounting structure to the base structure, the second mounting structure having a second configuration.

According to another broad aspect of the present invention, there is provided an interface for connection between a base structure and a mounting structure, the base structure mountable onto an actuator of a molding system. The interface comprises a mounting interface for releasably connecting the mounting structure to the base structure; a service interface for connecting, in use, a service between the base structure and the mounting structure.

A technical effect, amongst others, of the aspects of the present invention may include reduced time required to re-configure the EOAT. Another technical effect of the aspects of the present invention may include reduced operating costs, for example, resulting from the reduced time required to re-configure the EOAT. Another technical effect of the present invention may include increased flexibility in adapting an existing take-off plate to accommodate differing numbers of part receptacles in potentially differing configurations, pitches or arrays. It should be expressly understood that not all of the technical effects, in their entirety, need be realized in each and every embodiments of the present invention.

DESCRIPTION OF THE DRAWINGS

A better understanding of the embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 1:
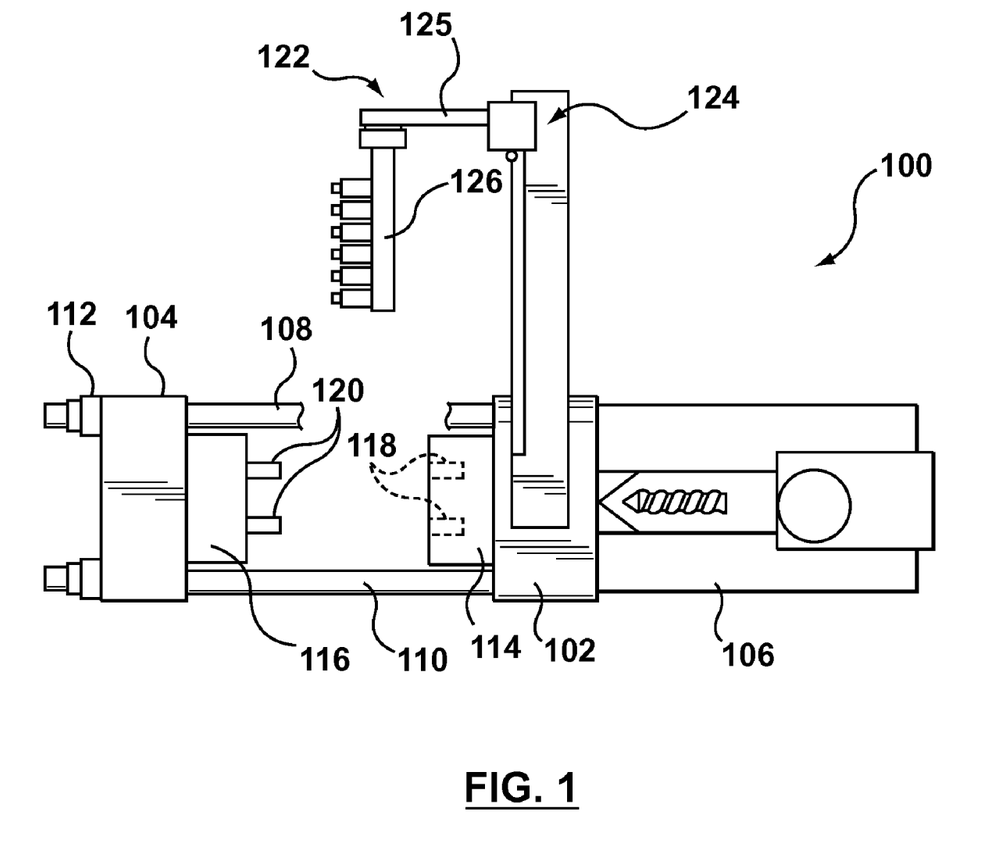
FIG. 1 is a schematic representation of a molding system 100 according to a non-limiting embodiment of the present invention.

With reference to FIG. 1, there is depicted a non-limiting embodiment of a molding system 100 which can be adapted to implement embodiments of the present invention. For illustration purposes only, it shall be assumed that the molding system 100 comprises an injection molding system for processing molding material, such as, PET for example. However, it should be understood that in alternative non-limiting embodiments, the molding system 100 may comprise other types of molding systems, such as, but not limited to, plastic injection molding system, plastic compression molding systems, metal molding systems and the like. It should be further understood that embodiments of the present invention are applicable to the molding system 100 incorporating any multicavitation mold, including PET molds, thinwall articles molds, closures molds and the like.

Within the non-limiting embodiment of FIG. 1, the molding system 100 comprises a fixed platen 102 and a movable platen 104. The molding system 100 further comprises an injection unit 106 for plasticizing and injection of molding material. In operation, the movable platen 104 is moved towards and away from the fixed platen 102 by means of stroke cylinders (not shown) or any other suitable means. Clamp force (also referred to as closure or mold closure tonnage) can be developed within the molding system 100, for example, by using tie bars 108, 110 and a tie-bar clamping mechanism 112, as well as (typically) an associated hydraulic system (not depicted) that is usually associated with the tie-bar clamping mechanism 112. It will be appreciated that clamp tonnage can be generated using alternative means, such as, for example, using a toggle-clamp arrangement (not depicted) or the like.

A first mold half 114 can be associated with the fixed platen 102 and a second mold half 116 can be associated with the movable platen 104. In the specific non-limiting embodiment of FIG. 1, the first mold half 114 comprises one or more mold cavities 118. As will be appreciated by those of skill in the art, the one or more mold cavities 118 may be formed by using suitable mold inserts or any other suitable means. As such, the first mold half 114 can be generally thought of as a "mold cavity half". The second mold half 116 comprises one or more mold cores 120 complementary to the one or more mold cavities 118. As will be appreciated by those of skill in the art, the one or more mold cores 120 may be formed by using suitable mold inserts or any other suitable means. As such, the second mold half 116 can be generally thought of as a "mold core half".

The first mold half 114 can be coupled to the fixed platen 102 by any suitable means, such as a suitable fastener (not depicted) or the like. The second mold half 116 can be coupled to the movable platen 104 by any suitable means, such as a suitable fastener (not depicted) or the like. It should be understood that in an alternative non-limiting embodiment of the present invention, the position of the first mold half 114 and the second mold half 116 can be reversed and, as such, the first mold half 114 can be associated with the movable platen 104 and the second mold half 116 can be associated with the fixed platen 102.

In an alternative non-limiting embodiments of the present invention, the fixed platen 102 need not be stationary and may as well be moved in relation to other components of the molding system 100.

FIG. 1 depicts the first mold half 114 and the second mold half 116 in a so-called "mold open position" where the movable platen 104 is positioned generally away from the fixed platen 102 and, accordingly, the first mold half 114 is positioned generally away from the second mold half 116. For example, in the mold open position, a molded article (not depicted) can be removed from the first mold half 114 and/or the second mold half 116. In a so-called "mold closed position" (not depicted), the first mold half 114 and the second mold half 116 are urged together (by means of movement of the movable platen 104 towards the fixed platen 102) and cooperate to define (at least in part) a molding cavity (not depicted) into which the molten plastic (or other suitable molding material) can be injected, as is known to those of skill in the art. It should be appreciated that one of the first mold half 114 and the second mold half 116 can be associated with a number of additional mold elements, such as for example, split inserts (commonly referred to as "neck rings") for forming, for example, a neck area of a molded article. Furthermore, the first mold half 114 and the second mold half 116 may be associated with one or more leader pins (not depicted) and one or more leader bushings (not depicted), the one or more leader pins cooperating with one more leader bushings to assist in alignment of the first mold half 114 with the second mold half 116 in the mold closed position, as is known to those of skill in the art.

The molding system 100 further comprises a robot 122. It should be noted that in an alternative non-limiting embodiments of the present invention, other types of actuators can be used that may or may not include the robot 122. Generally speaking, the robot 122 can be used for molded article removing and/or post-mold cooling. The robot 122 can comprise an actuating portion 124, an actuating arm 125 and an End Of Arm Tool 126 (referred herein below for simplicity as EOAT 126). The actuating portion 124 is coupled to the fixed platen 102 by means of a suitable fastener (not depicted), such as suitable bolts and the like. Generally speaking, the actuating portion 124 is configured to be coupled to a controller (not depicted) of the molding system 100 to implement, at least partially under the control of the controller (not depicted), one or more routines. Examples of such routines include, but are not limited to, moving the EOAT 126 into an open space defined between the first mold half 114 and the second mold half 116 in the mold open position, causing the EOAT 126 to receive the molded article from the one or more mold cores 120, moving the EOAT 126 away from the open space defined between the first mold half 114 and the second mold half 116 in the mold open position, etc.

Naturally, the molding system 100 may comprise a number of additional components, such as a hot runner (not depicted) associated, for example, with the fixed platen 102 and a stripper assembly for implementing (at least in part) ejection of the molded articles. Furthermore, the molding system 100 may optionally or additionally comprise auxiliary equipment (not depicted), such as humidifiers, heaters and the like. All this equipment is known to those of skill in the art and, as such, will not be discussed at any length here.

It should be expressly understood that the molding system 100 may have other configurations and the description presented above has been provided as an example only and is not intended to be limiting in any form. In other non-limiting embodiments of the present invention, the molding system 100 can have other configurations with more or fewer components.

Figure 2:
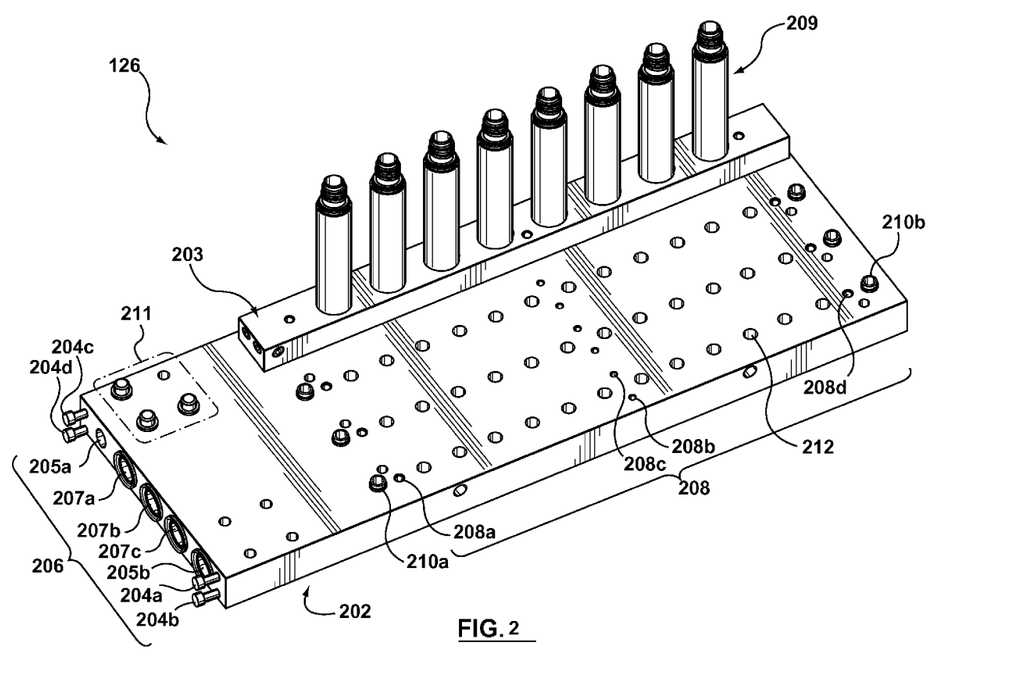
FIG. 2 is a perspective view of an EOAT, in a partially assembled state, of the molding system 100 of FIG. 1, according to a non-limiting embodiment of the present invention.

With reference to FIG. 2, a non-limiting embodiment of the EOAT 126 (for use in the molding system 100 of FIG. 1) will now be described in greater detail. The EOAT 126 comprises a base structure 202 and a mounting structure 203. Generally speaking, the purpose of the base structure 202 is (i) to be mounted upon the actuating arm 125 of the molding system 100 of FIG. 1 and (ii) to releasably accept the mounting structure 203. Generally speaking, the purpose of the mounting structure 203 is to releasably accept one or more part receptacles 209. In the specific non-limiting embodiment of FIG. 2, the one or more part receptacles 209 comprise one or more cooling tubes. However, it should be expressly understood that the part receptacles 209 may be realized in a number of alternative configurations and arrangements. In an alternative non-limiting embodiment of the present invention, the base structure 202 can be mounted onto another element of the molding system 100, such as, for example, the fixed platen 102, etc.

It is worthwhile noting that within the embodiment of FIG. 2, four instances of the mounting structure 203 are required to fully cover the base structure 202 (however, only one instance of the mounting structure 203 is depicted for the sake of simplicity and ease of illustration). Within this embodiment of the present invention, each of the four instances of the mounting structure 203 can be thought of as a "mounting rail". However, in an alternative non-limiting embodiment of the present invention, fewer than four instances of the mounting structure 203 can be used, for example three instances of the mounting structure 203. Within these embodiments of the present invention, the uncovered portion of the base structure 202 can be blocked by any known means (such as, for example, using a known purging technique and the like). In yet further non-limiting embodiments of the present invention, each of the mounting structures 203 may in itself be formed with one or more sub-structures. For example, the mounting structure 203 depicted in FIG. 2 may comprise two or more mounting structures 203 that are assembled together to fully cover the horizontal pitch of the base structure 202.

Continuing with the description of FIG. 2, the base structure 202 comprises a mounting interface for mounting the base structure 202 onto the actuating arm 125. In the specific non-limiting embodiments of the present invention, the mounting interface comprises a first mounting interface 204a, a second mounting interface 204b, a third mounting interface 204c and a fourth mounting interface 204d (jointly referred to as a "mounting interface 204"). The mounting interface 204 can be implemented as a threaded bore configured to receive a complementary bolt or, alternatively, as any removable or permanent coupling known in the art. Alternatively or additionally, the base structure 202 can comprise a secondary mounting interface 211 for mounting the base structure 202 to the actuating arm 125.

The base structure 202 further comprises a service connecting interface 206. The service connecting interface 206 comprises a cooling interface 205 and an air interface 207. In the specific non-limiting embodiment depicted in FIG. 2, the cooling interface 205 comprises a first cooling interface 205a and a second cooling interface 205b. The first cooling interface 205a and the second cooling interface 205b can be coupled to a source of coolant (not depicted) via the actuating arm 125 to provide a coolant (such as, for example, water, etc.). In use, one of the first cooling interface 205a and the second cooling interface 205b can be an in-flow interface and the other one of the first cooling interface 205a and the second cooling interface 205b can be an out-flow interface.

In the specific non-limiting embodiment of the present invention depicted in FIG. 2, the air interface 207 comprises a first air interface 207a, a second air interface 207b and a third air interface 207c. In use, the first air interface 207a, the second air interface 207b and the third air interface 207c are coupled to a source of air via the actuating arm 125 to provide vacuum. As will be appreciated by those skilled in the art, the exact number of air interfaces 207 used will depend on the number of so-called "positions" used within a post-mold cooling cycle. Within the specific non-limiting embodiment of FIG. 2, the base structure 202 is depicted with three instances of the air interface 207, which corresponds to a so-called "three position" post-mold cooling cycle. It should be expressly understood that any suitable number of instances of the air interface 207 can be used.

The base structure 202 further comprises a plurality of mounting structure interfaces 208 for releasably accepting the mounting structure 203. In the specific non-limiting embodiment depicted in FIG. 2, each of the plurality of the mounting structure interfaces 208 comprises a first mounting structure interface 208a, a second mounting structure interface 208b, a third mounting structure interface 208c and a fourth mounting structure interface 208d jointly referred to as the "mounting structure interface 208"). In some embodiments of the present invention, each of the mounting structure interfaces 208 comprises a threaded bore for accepting a complementary bolt. In other embodiments of the present invention, each of the mounting structure interfaces 208 comprises a receptacle for a quarter-turn bolt. Examples of the quarter-turn bolt receptacles include, but are not limited to, quarter-turn bolt receptacle PR0979 available from Fastloc (http://www.befestiger.de/). In yet further embodiments, each of the mounting structure interfaces 208 comprises any other suitable receptacle for detachably receiving a complementary fastener disposed on the mounting structure 203. It should be expressly noted that the number of instances of mounting structure interfaces 208 is not particularly limited. In the specific non-limiting embodiment depicted in FIG. 2, the base structure 202 comprises four instances of the mounting structure interfaces 208, one for each instance of the mounting structure 203. However, it should be expressly understood that more or fewer instances of the mounting structure interfaces 208 can be used, as will be explained in greater detail herein below.

Further, even though FIG. 2 depicts each of the mounting structure interfaces 208 comprising four instances of the first mounting structure interface 208a, the second mounting structure interface 208b, the third mounting structure interface 208c and the fourth mounting structure interface 208d; this need not be so in every embodiment of the present invention. For example, in an alternative non-limiting embodiment of the present invention, each or some of the mounting structure interfaces 208 can comprise three instances of the first mounting structure interface 208a, the second mounting structure interface 208b and the third mounting structure interface 208c. In an alternative non-limiting embodiment of the present invention, each or some of the mounting structure interfaces 208 can comprise two instances of the first mounting structure interface 208a and the fourth mounting structure interface 208d. It should be expressly understood that other combinations of the first mounting structure interface 208a, the second mounting structure interface 208b, the third mounting structure interface 208c and the fourth mounting structure interface 208d are also possible. Accordingly, it can be said that a given one of the mounting structure interfaces 208 can comprise at least two instances of the first mounting structure interface 208a and the second mounting structure interface 208b.

The base structure 202 further comprises a plurality of first cooling connecting interfaces 210. Generally speaking, the purpose of the plurality of first cooling connecting interfaces 210 is to connect the coolant between the cooling interface 205 and the mounting structure 203. In the specific non-limiting embodiment depicted in FIG. 2, each instance of the plurality of first cooling connecting interfaces 210 is provided in pairs—a first cooling connecting interface 210a and a first cooling connecting interface 210b, one being an in-flow interface and the other being an out-flow interface. As is better seen in FIG. 3, the base structure 202 further comprises a cooling manifold 302 for connecting the cooling interface 205 to the plurality of first cooling connecting interfaces 210. Configuration of such cooling manifold 302 is known to those of skill in the art and it is therefore sufficient to say that the manifold is essentially realized by a network of conduits that provide a flow path.

Returning to the description of FIG. 2, in some embodiments of the present invention, each of the plurality of the first cooling connecting interfaces 210 comprises a spigot. In alternative non-limiting embodiments of the present invention, each of the first cooling connecting interfaces 210 comprises a pressure-disconnectable coupling mechanism, which remains open so long as the pressure-disconnectable coupling mechanism is activated through engagement by a complementary "nipple" (or the like) associated with a corresponding mounting structure 203. In alternative non-limiting embodiments of the present invention, each of the first cooling connecting interfaces 210 comprises a "nipple" (or the like) complementary to a pressure-disconnectable coupling mechanism associated with a corresponding mounting structure 203. An example of the pressure-disconnectable coupling mechanism and the associated nipple that can be used includes, but is not limited to, screw-in coupling mechanism and the associated nipple available from Andreas Maier GmbH & Co. (http://www.amf.de/), supplier part number 6989M-90-001-001 and 6989N-90-001-001, respectively. Those of skill in the art will appreciate other suitable configurations for the plurality of first cooling connecting interfaces 210.

In the specific non-limiting embodiment depicted in FIG. 2, the base structure 202 comprises four instances of the first cooling connecting interfaces 210, one for each instance of the mounting structure 203 (with each instance of the first cooling connecting interfaces 210 comprising a pair of first cooling connecting interfaces 210a, 210b). However, it should be expressly understood that more or fewer instances of the first cooling connecting interfaces 210 can be used, as will be explained in greater detail herein below.

Continuing with the description of FIG. 2, the base structure 202 further comprises a plurality of first air connecting interfaces 212. Generally speaking, the purpose of the plurality of first air connecting interfaces 212 is to connect the air between the air interface 207 and the mounting structure 203. In some embodiments of the present invention, each of the plurality of first air connecting interfaces 212 comprises a respective bore. As is better seen in FIG. 3, the base structure 202 further comprises an air manifold 304 for connecting the air interface 207 to the plurality of first air connecting interfaces 212. In the specific non-limiting embodiment of the present invention depicted with reference to FIG. 3, the air manifold 304 comprises three sub-assemblies—a first air manifold sub-assembly 304a, a second air manifold sub-assembly 304b and a third air manifold sub-assembly 304c. The first air manifold sub-assembly 304a connects the first air interface 207a to a first plurality of first air connecting interfaces 212a. The second air manifold sub-assembly 304b connects the second air interface 207b to a second plurality of first air connecting interfaces 212b. The third air manifold sub-assembly 304c connects the third air interface 207c to a third plurality of first air connecting interfaces 212c. Given this configuration, vacuum in the first plurality of first air connecting interfaces 212a, the second plurality of first air connecting interfaces 212b and the third plurality of first air connecting interfaces 212c can be independently applied and controlled by controlling supply of vacuum via a respective one of the first air interface 207a, the second air interface 207b and the third air interface 207c.

Figure 3:
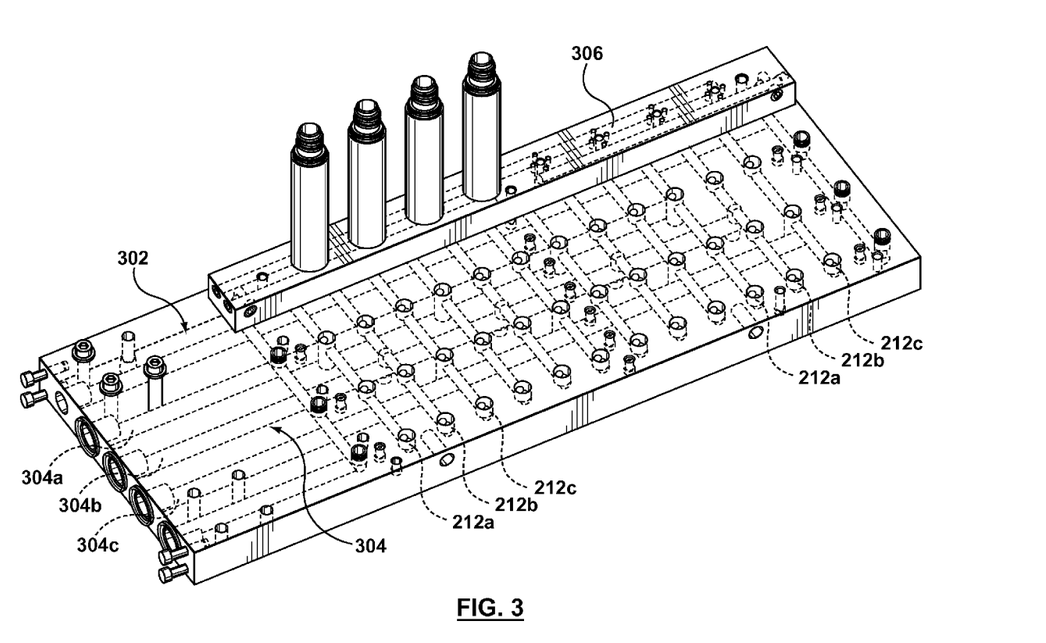
FIG. 3 is a perspective partially transparent view of the EOAT of FIG. 2 according to a non-limiting embodiment of the present invention.
Figure 4:
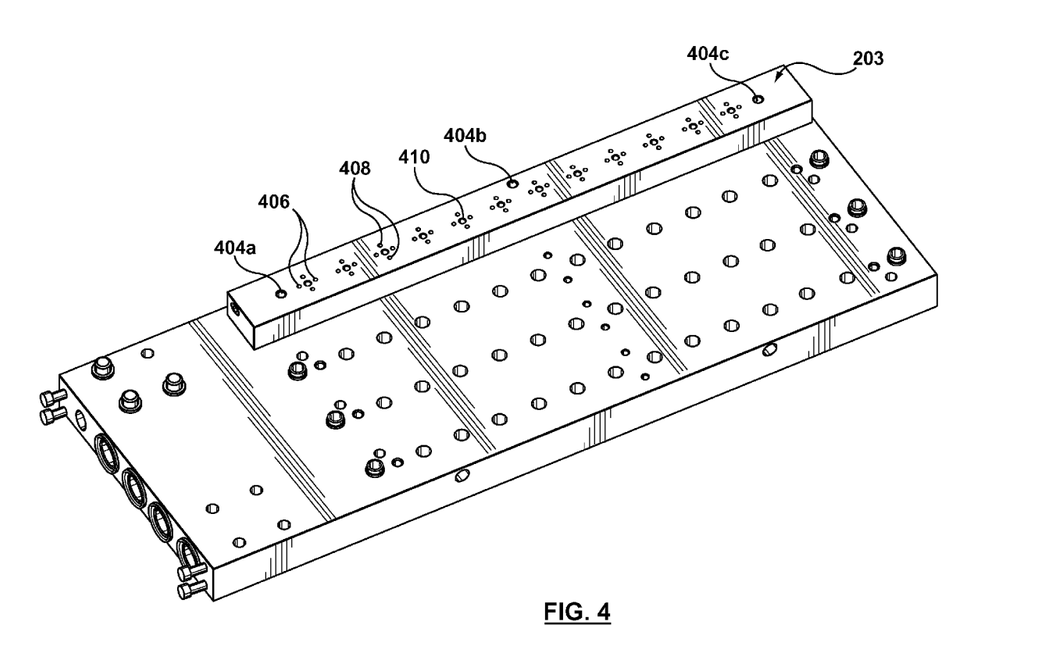
FIG. 4 is perspective view of the EOAT of FIG. 2 depicting a mounting structure in more detail, according to a non-limiting embodiment of the present invention.

With reference to FIG. 4, configuration of a front face of the mounting structure 203 will now be described in greater detail. FIG. 4 depicts a front view of the mounting structure 203. The mounting structure 203 comprises a base structure interface 404. In the specific non-limiting embodiment of FIG. 4, the base structure interface 404 comprises a first base structure interface 404a, a second base structure interface 404b and a third base structure interface 404c. The first base structure interface 404a is complementary to the first mounting structure interface 208a. Similarly, the third base structure interface 404c is complementary to the fourth mounting structure interface 208d. The second base structure interface 404b is complementary to either one of the second mounting structure interface 208b and the third mounting structure interface 208c. An additional technical effect that can be achieved within the specific non-limiting embodiment of FIG. 4 and FIG. 3 is that the mounting structure 203 can be releasably coupled to the base structure 202 irrespective of the position of the second base structure interface 404b. In other words, the mounting structure 203 can be rotated 180 degrees clockwise from the position as depicted in FIG. 4 and it can still be mounted onto the base structure 202.

However, in alternative non-limiting embodiments of the present invention, the mounting structure 203 can comprise a base structure interface 404 having two instances of the first base structure interface 404a and the third base structure interface 404c. Other configurations are possible and are within the scope of embodiments of the present invention.

In some embodiments of the present invention, each of the base structure interface 404 comprises a bolt complementary to the above-mentioned threaded bore of the base structure 202. In other embodiments of the present invention, each of the base structure interface 404 comprises a quarter-turn bolt. Examples of the quarter-turn bolt include, but are not limited to, quarter-turn bolt SK0979 available from Fastloc (http://www.befestiger.de/). In yet further embodiments, each of the base structure interface 404 comprises any other suitable fastener complementary to the mounting structure interfaces 208 described above.

Figure 5:
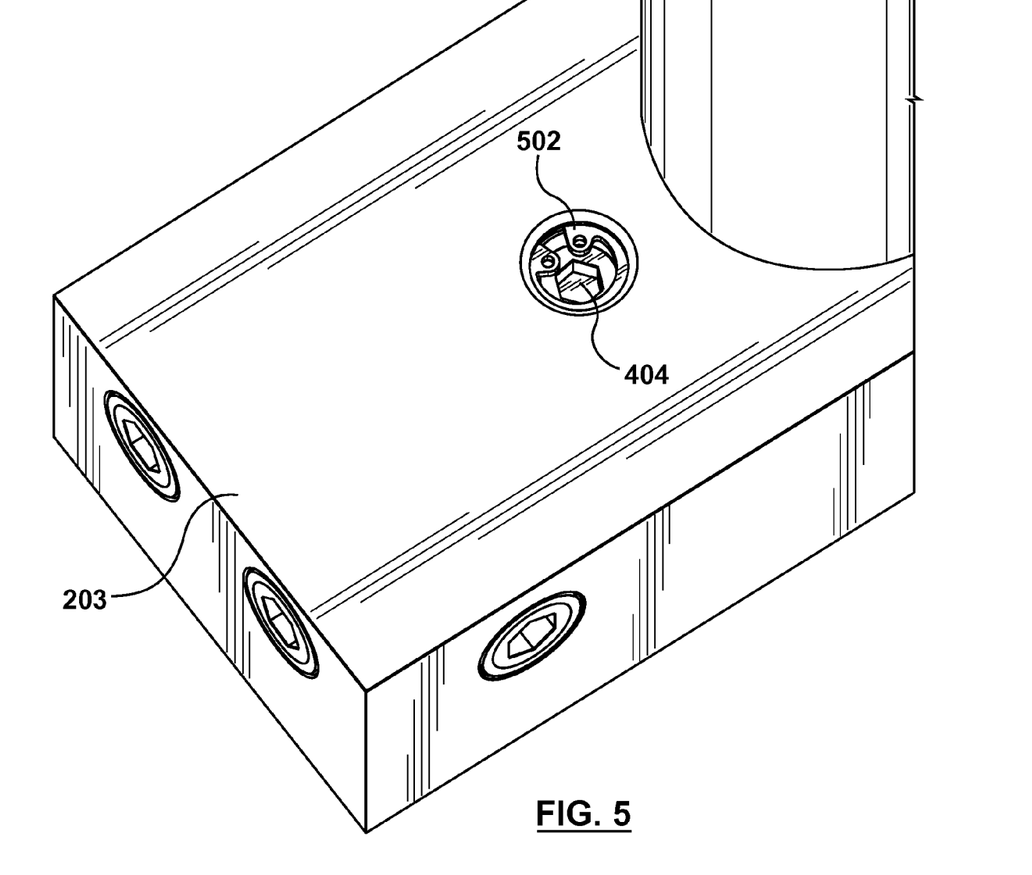
FIG. 5 is a perspective view of an end portion of the mounting structure of the EOAT of FIG. 2 depicting a retaining structure, according to a non-limiting embodiment of the present invention.

With reference to FIG. 5, in some non-limiting embodiments of the present invention, the base structure interface 404 can further comprise a retaining structure 502. Generally speaking, the purpose of the retaining structure 502 is to prevent the base structure interface 404 from being inadvertently detached from the mounting structure 203. In the specific non-limiting embodiment depicted in FIG. 5, where the base structure interface 404 comprises a bolt, the retaining structure 502 comprises a generally circular member, such as a spring clip, that cooperates with a head portion of the bolt to prevent the bolt from being detached from the mounting structure 203. An additional technical effect that can be enjoyed within the specific non-limiting embodiment depicted in FIG. 5 is that a technician (or another person) handling the mounting structure 203 does not have to be concerned about loosing the bolt(s) disposed on the mounting structure 203. It should be expressly understood that in alternative non-limiting embodiments of the present invention, the retaining structure 502 can be implemented in other configurations or can be omitted altogether.

The mounting structure 203 further comprises a plurality of second cooling connecting interfaces 408. Generally speaking, the plurality of second cooling connecting interfaces 408 cooperate, in use, with the plurality of first cooling connecting interfaces 210 to supply coolant to the part receptacles 209. More specifically and with further reference to FIG. 3, the mounting structure 203 comprises a cooling distribution sub-system 306. The cooling distribution sub-system 306 connects, in use, each of the first cooling connecting interfaces 210a and the first cooling connecting interfaces 210b to the plurality of second cooling connecting interfaces 408.

Returning to the description of FIG. 4, the mounting structure 203 further comprises a plurality of second air connecting interfaces 410. Generally speaking, the plurality of second air connecting interfaces 410 cooperate, in use, with the plurality of first air connecting interfaces 212 to supply air to the part receptacles 209.

The mounting structure 203 further comprises a plurality of part receptacle mounting interfaces 406. Generally speaking, the purpose of the plurality of part receptacle mounting interfaces 406 is to position the one or more part receptacles 209 in relation to the mounting structure 203. More specifically, the purpose of the plurality of part receptacle mounting interfaces 406 is to align the position of the one or more part receptacles 209 so that they properly align with the plurality of second cooling connecting interfaces 408 and/or other components thereof.

In the specific non-limiting embodiment depicted in FIG. 4, the plurality of part receptacle mounting interfaces 406 comprises a respective pair of receptacles configured to releasably accept a complementary pair of positioning members, such as a dowel or any other suitable type of a positioning member, disposed on the one or more part receptacles 209. It should be understood that in an alternative non-limiting embodiment of the present invention, the plurality of part receptacle mounting interfaces 406 may comprise a respective single receptacle configured to releasably accept a complementary single positioning member (such as, a dowel or any other suitable type of a positioning member).

In some embodiments of the present invention, an internal surface of each of the plurality of second air connecting interfaces 410 may be threaded, at least in part, in order to releasably accept a hollow bolt or another type of a hollow fastener. Within these embodiments of the present invention, the plurality of second air connecting interfaces 410 may be said to perform two functions: (i) to connect, in use, air and (ii) in cooperation with the plurality of part receptacle mounting interfaces 406, to releasably accept and maintain in an operating position the one or more part receptacles 209.

In some embodiments of the present invention, the plurality of second air connecting interfaces 410 may further comprise a ball valve in order to regulate supply of air at various stages of the post-mold cooling cycle. For example, in some embodiments of the present invention, different supply of air may be required for a first stage of the post-mold cooling when a molded article (i.e. a preform) is being received within one or more part receptacles 209 vis-à-vis a subsequent stage of the post mold cooling when the molded article (i.e. the preform) is being removed from the one or more part receptacles 209.

Figure 6:
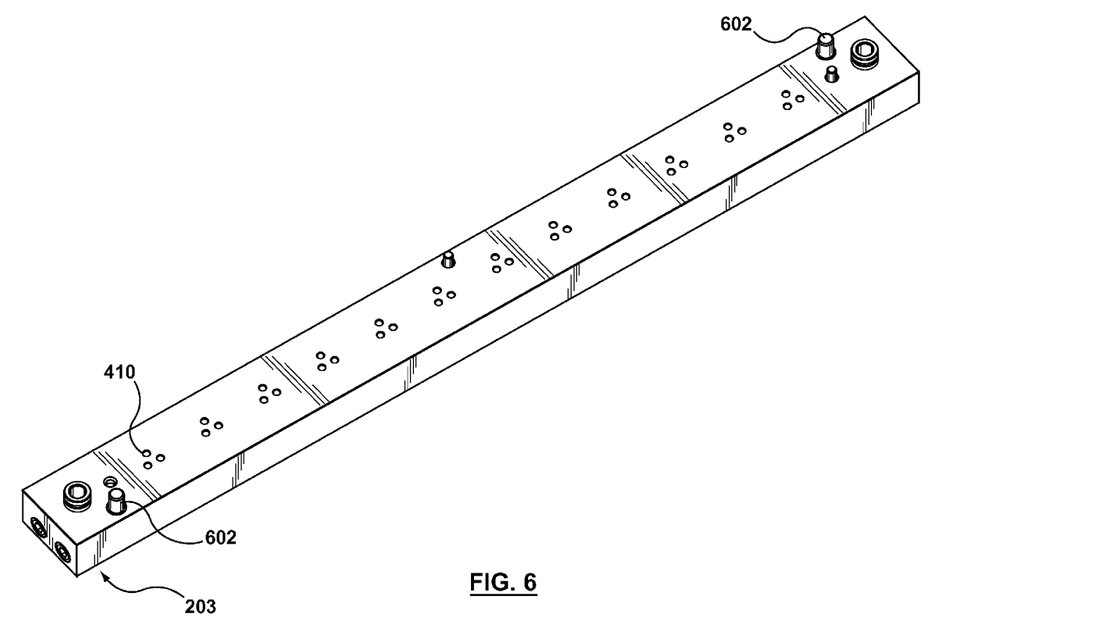
FIG. 6 is perspective view of a back face of the mounting structure of the EOAT of FIG. 2, according to a non-limiting embodiment of the present invention.
Figure 7:
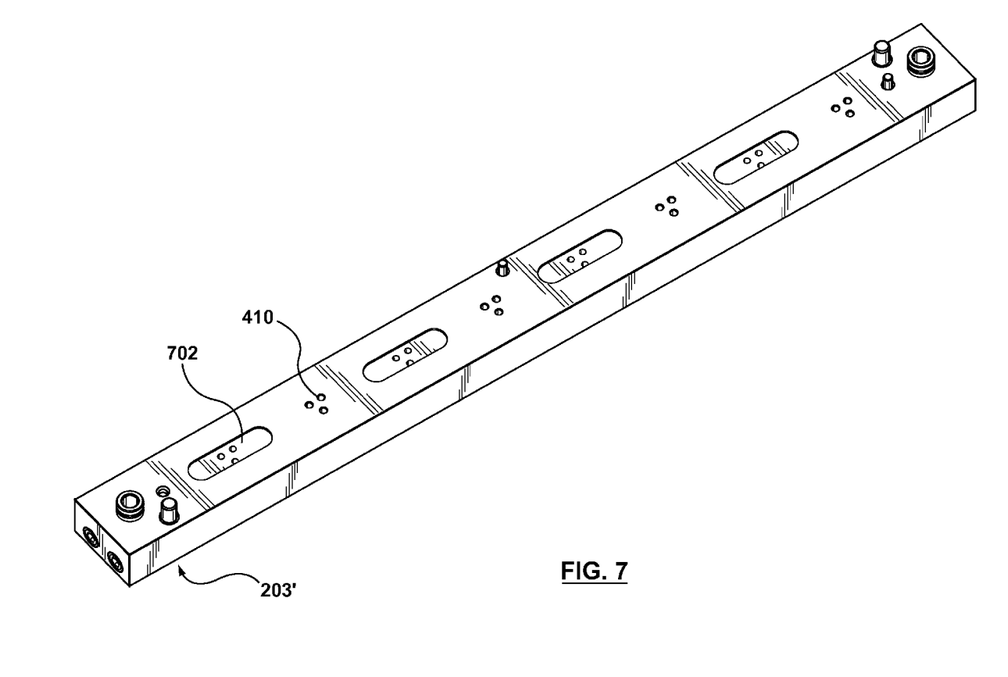
FIG. 7 is perspective view of a back face of the mounting structure of the EOAT of FIG. 2, according to another non-limiting embodiment of the present invention.

With reference to FIGS. 6 and 7 a configuration of a back face of the mounting structure 203 will now be described in greater detail. FIG. 6 depicts the back face of the mounting structure 203. FIG. 7 depicts a back face of a mounting structure 203'. The mounting structure 203' is substantially similar to the mounting structure 203 but for the specific differences discussed herein below.

Figure 11:
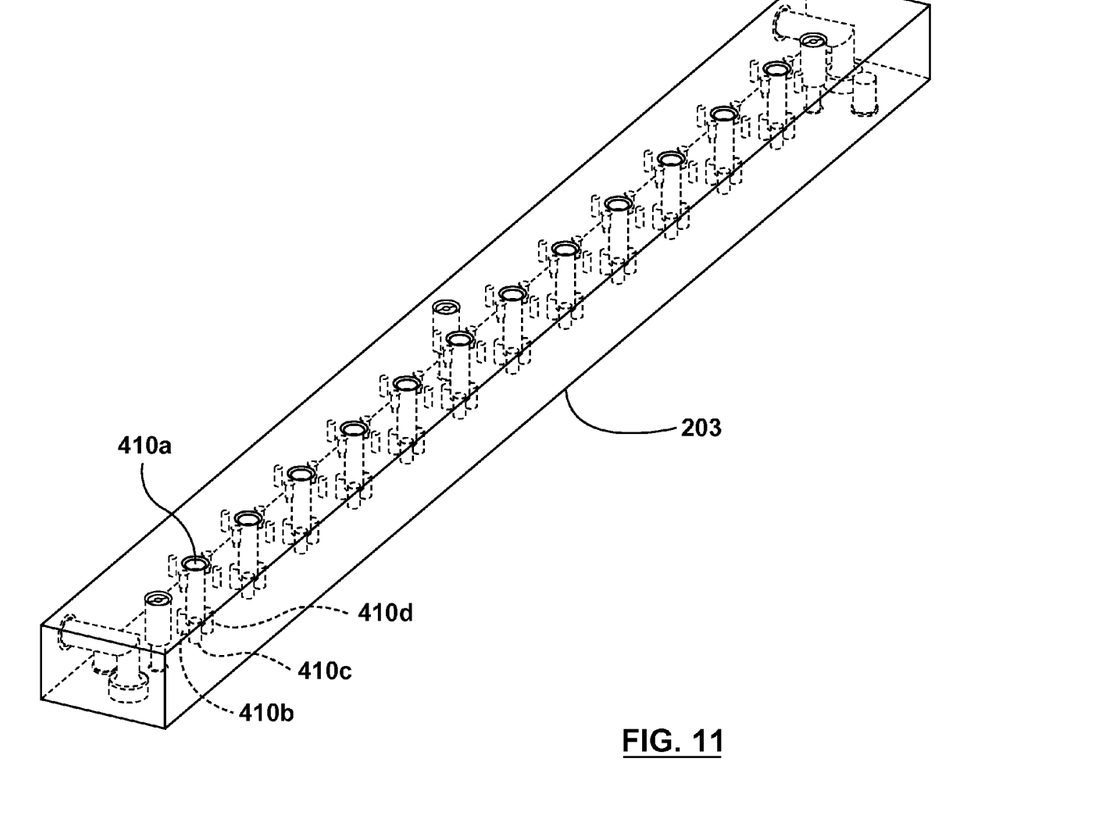
FIG. 11 is a schematic partially transparent view of the mounting structure of the EOAT of FIG. 2, depicting a plurality of second air connecting interfaces according to a non-limiting embodiment of the present invention.

As depicted in FIG. 6, the back face of the mounting structure 203 comprises a back portion of the plurality of second air connecting interfaces 410. The back portion of the plurality of second air connecting interfaces 410 comprises three inlets terminating into a single outlet (as is best seen in FIG. 4). This arrangement is best seen in FIG. 11, which depicts a partially transparent view of the mounting structure 203 of FIG. 6 (with certain elements, such as, the cooling distribution sub-system 306, omitted for the sake of simplicity of illustration). The second air connecting interfaces 410 comprises three inlets 410b, 410c, 410d on the back portion terminating into a single outlet 410a on the front portion thereof. It should be expressly understood that other configurations of the back and front portions of the plurality of second air connecting interfaces 410 are possible.

In some embodiments of the present invention, the mounting structure 203 may optionally comprise one or more positioning members 602 that can be used to assist in positioning the mounting structure 203 onto the base structure 202. In a specific non-limiting embodiment of the present invention, the one or more positioning members 602 comprise a respective dowel that cooperates with a bore or hole on the base structure 202. It should be noted that in the specific non-limiting embodiment depicted with reference to FIG. 6, the mounting structure 203 comprises twelve instances of the second air connecting interfaces 410, corresponding to twelve instances of part receptacle mounting interfaces 406 and twelve instances of second cooling connecting interfaces 408. As will be appreciated, this arrangement is configured for accepting twelve instances of part receptacles 209 and can be generally used for three-position post-mold cooling cycle within the molding system 100, which in this example can be a sixteen-cavity injection molding system. A mounting structure 203 in a fully assembled state with twelve instances of part receptacles 209 is better depicted in FIG. 8, which depicts a perspective view thereof.

As depicted in FIG. 7, the mounting structure 203' comprises eight instances of the second air connecting interfaces 410, corresponding to eight instances of part receptacle mounting interfaces 406 and eight instances of second cooling connecting interfaces 408. As will be appreciated, this arrangement is configured for accepting eight instances of part receptacles 209 and can be generally used for two-position post-mold cooling cycle within the molding system 100, which in this example can be a sixteen-cavity injection molding system. The mounting structure 203' in a fully assembled state with eight instances of part receptacles 209 is better depicted in FIG. 9, which depicts a perspective view thereof.

Returning to FIG. 7, the mounting structure 203' further comprises a bridging structure 702. The bridging structure 702 is configured to cooperate with the above-described first plurality of first air connecting interfaces 212a, second plurality of first air connecting interfaces 212b and third plurality of first air connecting interfaces 212c. The bridging structure 702 is configured to bridge two of the first plurality of first air connecting interfaces 212a, second plurality of first air connecting interfaces 212b and third plurality of first air connecting interfaces 212c. The bridging structure 702 can be used when a number of post-mold cooling positions of the mounting structure 203' is fewer then the number of post-mold cooling positions of the mounting structure 203.

It should be clear that the configuration of the base structure 202 and the mounting structure of FIG. 2 can have a number of other alternative implementations. An example of such an alternative non-limiting implementation will now be described with reference to FIG. 10, which depicts an EOAT 1126 according to another non-limiting embodiment of the present invention. The EOAT 1126 is substantially similar to the EOAT 126 of FIG. 1 but for the specific differences discussed herein below and, as such, like elements are depicted with like numerals.

Figure 10:
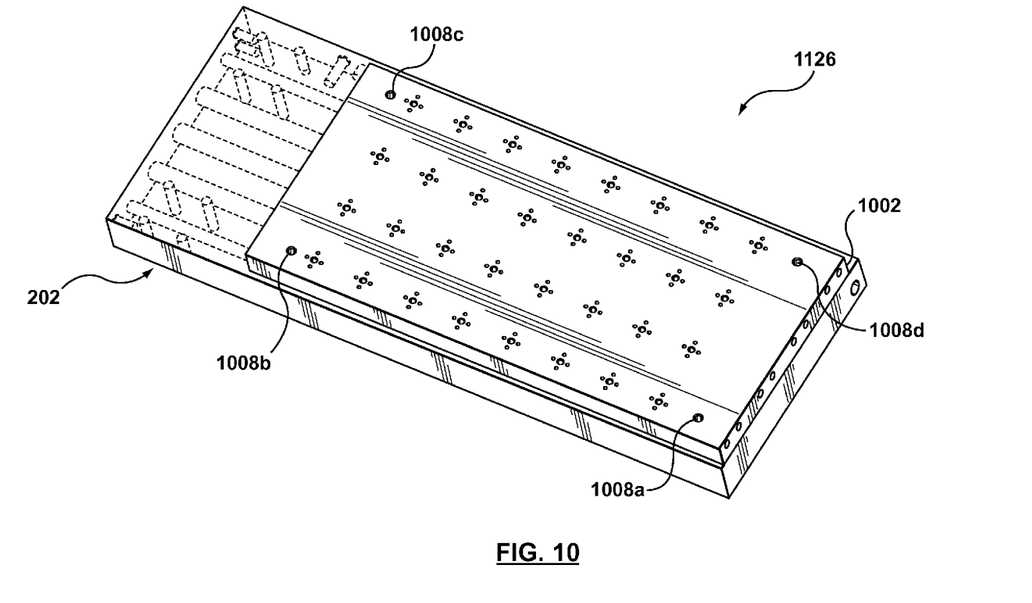
FIG. 10 is a perspective view of an EOAT, in a partially assembled state, of the molding system 100 of FIG. 1, according to another non-limiting embodiment of the present invention.

The EOAT 1126 comprises a mounting structure 1002. With reference to FIGS. 2 and 10, it should be clear that the mounting structure 1002 is substantially similar to the mounting structure 203. However, rather than requiring four instances of the mounting structure 203 of FIG. 2 to fully cover the base structure 202, the mounting structure 1002 comprises a single plate, which essentially incorporates four instances of the mounting structure 203 in a substantially unitary structure of the mounting structure 1002. Within this embodiment of the present invention, the mounting structure 1002 can be thought of as a "mounting plate".

The mounting structure 1002 comprises a base structure interface 1008, which can be substantially similar to the base structure interface 404. In the specific non-limiting embodiment of FIG. 10, the base structure interface 1008 comprises a first base structure interface 1008a, a second base structure interface 1008b, a third base structure interface 1008c and a fourth base structure interface 1008d. Even through not specifically depicted in FIG. 10, one will appreciate that the base structure 202 of FIG. 10 comprises a complementary mounting structure interface (not depicted), which can be substantially similar to the mounting structure interfaces 208 described above. In the specific non-limiting embodiment depicted in FIG. 10, the mounting structure interface (not depicted) comprises four instances thereof, complementary to the four instances of the base structure interface 1008. However, one skilled in the art will appreciate that the base structure interface 1008 and the mounting structure interface (not depicted) can have other configurations, such as, for example, with more or fewer instances of each of the base structure interface 1008 and the mounting structure interface (not depicted).

It should be noted that the alternative embodiments of the EOAT 126 of FIG. 2 and the EOAT 1126 of FIG. 10 are just two examples of alternative non-limiting configurations. Those of ordinary skill in the art will readily appreciate that other alternative implementations are within embodiments of the present invention. For example, in yet alternative non-limiting embodiment of the present invention, the number of instances of the mounting structure 203 can be further varied.

It should now be clear that the arrangement of the base structure 202 and the mounting structure 203, 1002 can be used to provide adaptation of services (the air and coolant) to a different array of part receptacles, e.g. by modifying how service connecting interfaces interact with, ultimately, each cooling tube or sets of part receptacles. In a similar fashion, the mounting structure 203, 1002 can be modified to alter (e.g. redirect or concentrate) flows of supplied air to particular part receptacles, sets of part receptacles or different configurations or numbers of part receptacles that may, or may not, share a common or standard pitch between adjacent tubes or with the earlier mold's pitch).

Given the architectures described above, it is possible to implement a method for configuring an end of arm tool. For the purposes of the description to be presented herein below, it shall be assumed that the method is executed using the EOAT 126 of FIG. 2.

First Instance in Time—Initial Configuration Process

At a first instance in time, an initial configuration process is carried out. The initial configuration process can be carried out by an entity manufacturing the molding system 100 or by an entity managing the molding system 100. For example, a technician (or another representative of an entity managing the molding system 100) installs the base structure 202 onto the actuating arm 125. For example, the technician (or another representative of an entity managing the molding system 100) may use the mounting interface 204 to mount the base structure 202 onto the actuating arm 125. As part of this process, the technician (or another representative of an entity managing the molding system 100) can connect the service connecting interface 206 described above, as is known in the art.

The technician (or another representative of an entity managing the molding system 100) can then perform calibration of a connection between the base structure 202 and the actuating arm 125, as is known in the art.

The technician (or another representative of an entity managing the molding system 100) then attaches a mounting structure 203 onto the base structure 202, the mounting structure having a first configuration. For the avoidance of doubt, the term "first configuration" is intended to mean the number of part receptacles 209 that the mounting structure 203 is configured to releasably accept. For the purposes of this non-limiting illustration is shall be assumed that the first configuration is substantially similar to that depicted in FIG. 8.

Recalling that the base structure 202 comprises a plurality of mounting structure interfaces 208 and that the mounting structure 203 comprises a base structure interface 404, the technician (or another representative of an entity managing the molding system 100) couples the base structure interface 404 to the mounting structure interfaces 208. Naturally, as should be appreciated, the technician (or another representative of an entity managing the molding system 100) repeats this step four times for each instance of the mounting structure 203 of FIG. 2 to fully cover the base structure 202. However, in the embodiment of the mounting structure 1002 of FIG. 10 this step only needs to be carried out once.

The technician (or another representative of an entity managing the molding system 100) can then proceed to couple the one or more part receptacles 209 to the mounting structure 203, as is known in the art. For example, the technician (or another representative of an entity managing the molding system 100) can use the aforementioned plurality of part receptacle mounting interfaces 406.

By coupling the mounting structure 203 to the base structure 202 and then mounting the one or more part receptacles 209, the technician (or another representative of an entity managing the molding system 100) effectively performs the following:

operatively couples the plurality of second cooling connecting interfaces 408 to the cooling interface 205 via (i) the cooling distribution sub-system 306; (ii) the plurality of first cooling connecting interfaces 210, and (iii) the cooling manifold 302 in order to supply coolant to the part receptacles 209;

operatively couples the plurality of second air connecting interfaces 410 to the air interface 207 via (i) the plurality of first air connecting interfaces 212 and (ii) the air manifold 304 in order to provide vacuum suction to the part receptacles 209.

Operation of the EOAT 126 in the context of removing and cooling molded articles is known in the art and, as such, will not be discussed here at any length.

Second Instance in Time—Re-Configuration Process

Some time after the first instance, a re-configuration process is carried out. It should be expressly understood that the re-configuration process does not need to be carried out by the same entity that performs the initial configuration process. It should be further expressly understood, that the initial configuration process and the re-configuration process can be separated in time and/or place where they are carried out. It is assumed that it is desirable to change the configuration of the EOAT 126. One skilled in the art will appreciate numerous reasons as to why it may be desirable to change the configuration of the EOAT 126. For the purposes of this non-limiting illustration it shall be assumed that it is desirable to change the number of positions of the post-mold cooling cycle. More specifically, it shall be assumed that it is desirable to change the "three-position post-mold cooling cycle" arrangement to the "two-position post-mold cooling cycle" arrangement. Recalling that the mounting structure 203 depicted in FIG. 8 is particularly configured for the three-position post-mold cooling cycle and that the mounting structure 203' depicted in FIG. 9 is particularly configured for the two-position post-mold cooling cycle, it shall be assumed that it is desirable to remove the mounting structure 203 installed at the above-described first instance of time and replace it with the mounting structure 203' of FIG. 9.

Figure 8:
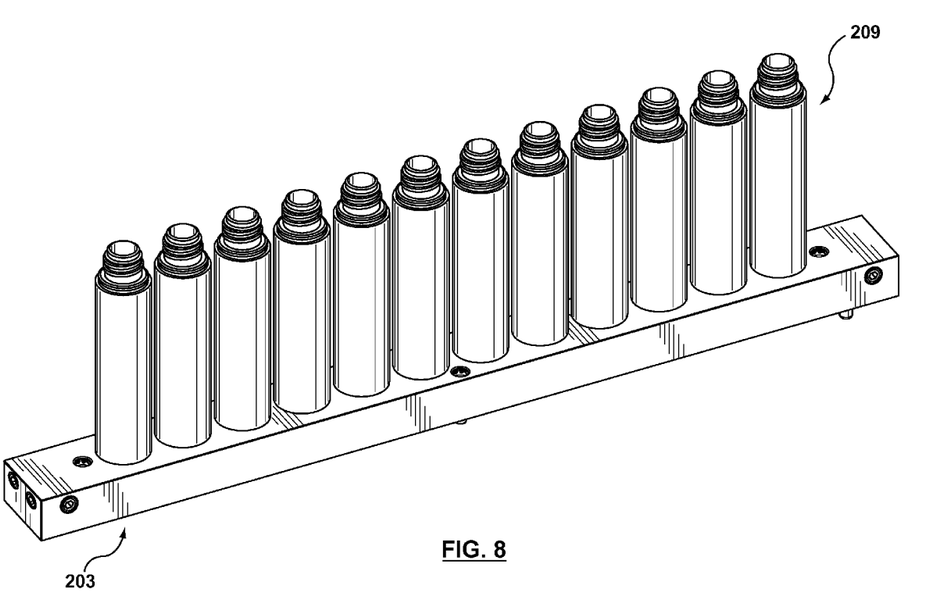
FIG. 8 is a perspective view of the mounting structure of the EOAT of FIG. 2 with part receptacles attached thereto, according to a non-limiting embodiment of the present invention.
Figure 9:
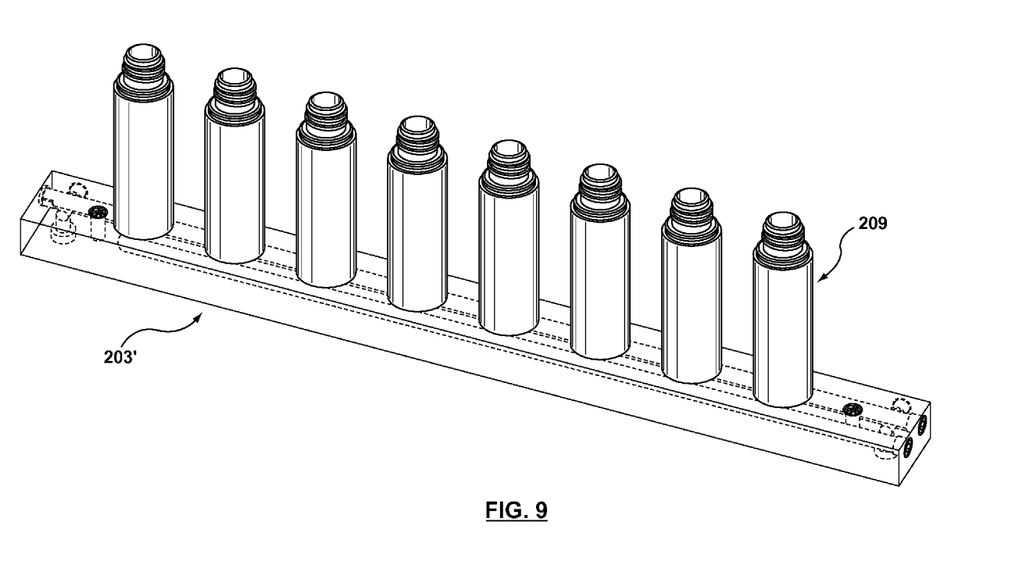
FIG. 9 is a perspective partially transparent view of the mounting structure of the EOAT of FIG. 2 with part receptacles attached thereto, according to another non-limiting embodiment of the present invention.

Accordingly, the technician (or another representative of an entity managing the molding system 100) removes the mounting structure 203 having a first configuration (i.e. the mounting structure 203 as depicted in FIG. 8) installed at the first instance in time and installs a mounting structure 203' having a second configuration (i.e. the mounting structure 203' as depicted in FIG. 9). Naturally, as should be appreciated, the technician (or another representative of an entity managing the molding system 100) repeats this step four times for each instance of the mounting structure 203 of FIG. 2 to fully cover the base structure 202. However, in the embodiment of the mounting structure 1002 of FIG. 10 this step only needs to be carried out once.

It should be recalled that in some embodiments of the present invention, each of the plurality of the first cooling connecting interfaces 210 comprises a spigot. Within these embodiments of the present invention, the coolant (i.e. water and the like) needs to be drained from the molding system 100, as is known to those of skill in the art, before the exchange of the mounting structure 203 can be performed. In those alternative non-limiting embodiments of the present invention, where each of the first cooling connecting interfaces 210 comprises a pressure-disconnectable coupling mechanism, the exchange of the mounting structure 203 can be performed without the need to drain the system. Within these non-limiting embodiments of the present invention, an additional technical effect of further reduction of time can be achieved.

Effectively, the technician (or another representative of an entity managing the molding system 100) has changed the configuration of the EOAT 126 from the three-position post molding cooling cycle to the two-position post molding cooling cycle. It should be expressly understood that the system and method described herein above can be used for changing other aspects of the configuration of the EOAT 126, such as, for example, the number of molded articles it can accept (or, in other words, to correspond to molds of various cavitations), etc.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. An end of arm tool for use within a molding system, the end of arm tool comprising:
   a base structure attachable, in use, to an actuator of the molding system, said base structure comprising a first mounting structure interface and a second mounting structure interface being located on the same face of the base structure;
   a first mounting structure configured to be releasably accepted, in use, within said first mounting structure interface; said mounting structure for receiving, in use, a plurality of first part receptacles;
   a second mounting structure configured to be releasably accepted, in use, within said second mounting structure interface; said second mounting structure for receiving, in use, a plurality of second part receptacles;
   said plurality of first part receptacles and said plurality of second part receptacles configured to receive respective molded articles directly from in-between mold halves in a mold-open configuration;
   said base structure comprising a service connecting interface configured to connect, in use, a service to said plurality of first part receptacles via said first mounting structure and said plurality of second part receptacles via said second mounting structure,
   whereby configuration of at least one of (i) the plurality of first part receptacles and (ii) the plurality of second part receptacles can be changed from a first configuration to a second configuration without detaching said base structure from said actuator.

2. The end of arm tool of claim 1, said service connecting interface being a first service connecting interface, wherein each of said first mounting structure and said second mounting structure comprise a respective second service connecting interface, and wherein said first service connecting interface cooperates with said respective second service connecting interface to connect, in use, said service to said plurality of first part receptacles and said plurality of second part receptacles via said mounting structure.

3. The end of arm tool of claim 2, wherein each of said first service connecting interface and said respective second service connecting interface comprises a respective cooling connecting interface and a respective air connecting interface.

4. The end of arm tool of claim 3, wherein one of said respective cooling connecting interface comprises a spigot.

5. The end of arm tool of claim 3, wherein one of said respective cooling connecting interface comprises a pressure-disconnectable coupling mechanism and the other one of said respective cooling connecting interface comprises a nipple complementary to said pressure-disconnectable coupling mechanism.

6. The end of arm tool of claim 1, wherein each of said first mounting structure interface and said second mounting structure interface comprises at least two threaded bores.

7. The end of arm tool of claim 6, wherein each of said first mounting structure and said second mounting structure comprises at least two bolts complementary to said at least two threaded bores.

8. The end of arm tool of claim 7, wherein each of said first mounting structure and said second mounting structure further comprises at least two retaining structures, said at least two retaining structures being configured to prevent said at least two bolts from being detached from the respective one of said first mounting structure and said second mounting structure.

9. The end of arm tool of claim 1, wherein each of said first mounting structure interface and said second mounting structure interface comprises at least two receptacles, each configured to releasably accept a quarter turn bolt.

10. The end of art tool of claim 9, wherein each of said first mounting structure and said second mounting structure further comprises at least two quarter turn bolts.

11. The end of arm tool of claim 1, wherein said service connecting interface comprises a cooling manifold and at least one air manifold.

12. The end of arm tool of claim 11, wherein said service connecting interface further comprises (i) a cooling interface for connecting, in use, said cooling manifold to a source of a coolant and (ii) at least one air interface for connecting, in use, said at least one air manifold to a source of air.

13. The end of arm tool of claim 11, wherein each of said first mounting structure and said second mounting structure comprises a cooling connecting interface and an air connecting interface, and wherein said cooling connecting interface and said air connecting interface cooperate, in use, with said cooling manifold and said at least one air manifold, respectively, to connect, in use, said service to said plurality first part receptacles and said plurality of second part receptacles via said mounting structure.

14. The end of art tool of claim 13, wherein said air connecting interface comprises a threaded bore; and wherein said threaded bore is configured to cooperate with a hollow fastener associated with a given one of said plurality of first part receptacles or said plurality of second part receptacles (i) to releasably accept the given one of the plurality of first part receptacles or the plurality of second part receptacles and (ii) to allow, in use, air to pass through said hollow fastener to said given one.

15. A molding system incorporating the end of arm tool of claim 1.

* * * * *